Patented Nov. 23, 1926.

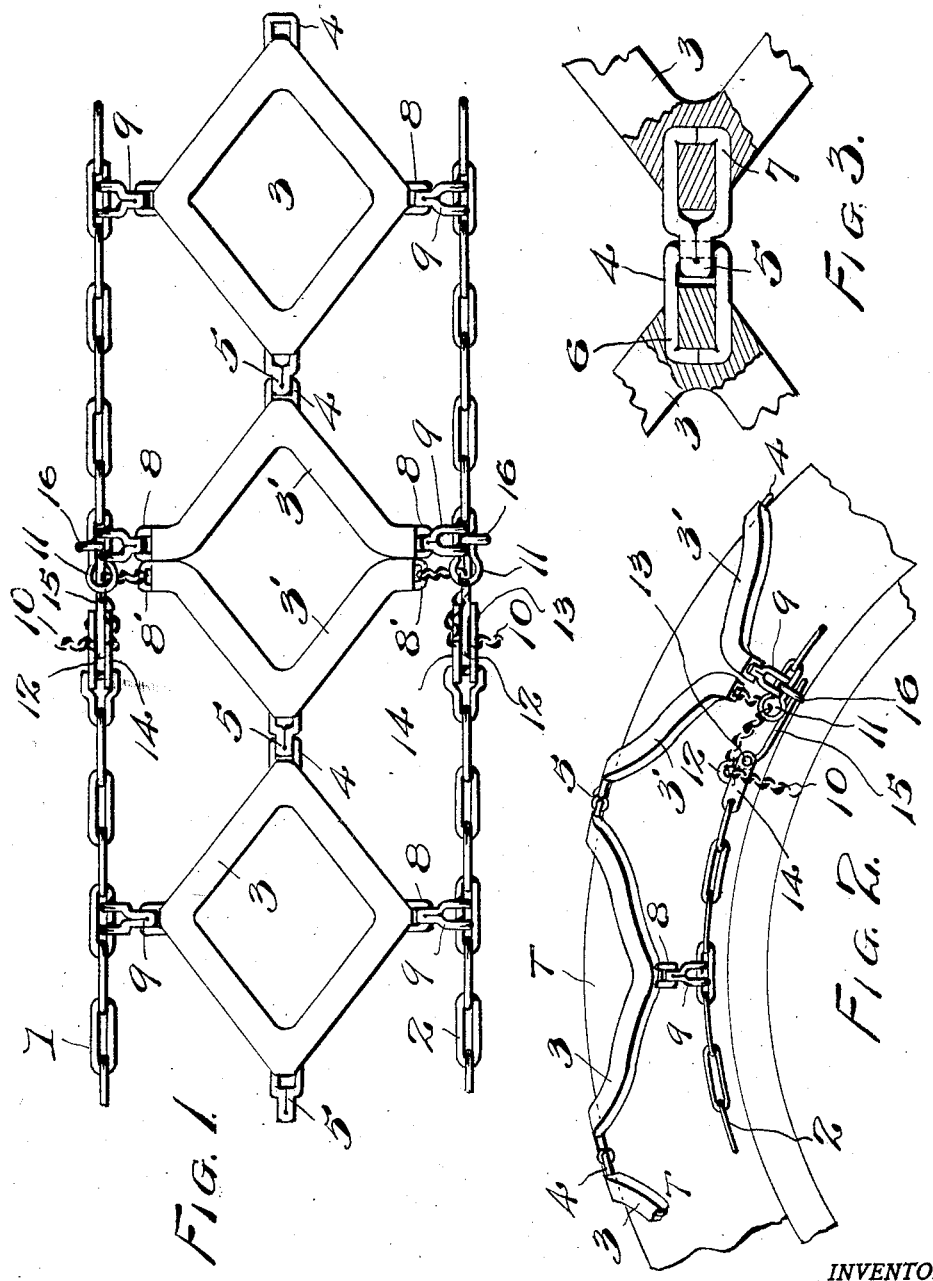

1,608,280

UNITED STATES PATENT OFFICE.

HARRY HARFORD, OF LEWISTON, IDAHO, ASSIGNOR TO HARFORD DIAMOND CHAIN COMPANY, OF LEWISTON, IDAHO.

ANTISKID BELT.

Application filed December 9, 1925. Serial No. 74,340.

My present invention relates to improvements in antiskid belts for pneumatic and solid tires for automotive vehicles, said belt being of the non-metallic, flexible type. The primary object of the invention is to simplify the construction; reduce the cost of manufacture and the cost of maintenance; and provide a device of this character that may with facility be applied to a tire and with equal facility be removed therefrom.

The invention consists essentially in the utilization of a series of circumferentially arranged diamond shaped tread members of non-metallic material, such as leather, rubberized fabric or other suitable material, having flexible connections between them and flexibly connected to side chains, in such manner that a worn tread member may with facility be removed and a new one placed in position for use, thus prolonging the life of the antiskid belt and maintaining it at all times in condition to perform its functions in the most efficient manner. Means are provided whereby the ends of the side chains and the ends of the tread belt may be conveniently joined when applying the belt for use and the belt may readily be opened prior to removal from a tire when not required for use.

In the accompanying drawings I have illustrated one complete example of the physical embodiment of my invention wherein the parts are combined and arranged in accordance with the best mode I have thus far devised for the practical application of the principles of my invention.

Figure 1 is a conventionalized plan view of a portion of the antiskid belt at its jointed or joined ends.

Figure 2 is a view in side elevation showing the relation of the belt to a tire.

Figure 3 is an enlarged detail sectional view showing the flexible connection between a pair of complementary diamond shaped tread members of the belt.

In order that the general relation of parts may be understood I have indicated a tire by the letter T in Figure 2, and it will be understood that the two side chains 1 and 2 of the antiskid belt encircles the tire in usual manner at the sides thereof.

Between the two side chains and extending circumferentially of the tread portion of the tire, which may be either flat as used for trucks or round as used on balloon or regular pneumatic tires, is located the antiskid belt comprising a succession of diamond shaped tread members 3 with their longer axes extending circumferentially of the tire. These members or tread links are fashioned in suitable manner from flexible, non-metallic material such as leather, rubberized fabric, laminated rubber fabric, or corded rubber composition and are of complementary form and size in order that they may readily be interchanged for replacement or renewal to compensate for wear. At their respective ends the tread links are provided with complementary eyes 4 and hooks 5 for co-action in connecting adjoining tread links of the traction or anti-skid belt. The eyes and hooks may be fashioned by suitable machinery or tools in the form of open links each having an anchoring loop as 6 or 7 and preferably of metal. The loops are anchored or embedded in the material at the ends of the tread links and project outwardly therefrom as best seen in Figure 3 and form flexible connections between the tread links. When a tread link is excessively worn it may be removed by first opening the hooks 5 from the eyes, after which the worn link may be removed and replaced with a new one of similar size and shape by fitting the hooks around the eyes.

At their lateral corners the tread links are provided with eyes 8 similar to the eyes 4, but these eyes 8 it will be observed project transversely of the circumferential axis of the tire and are adapted for co-action with complementary hooks 9 which are flexibly attached to the side chains 1 and 2.

The antiskid belt is in the form of an openable annular device and at the ends of the belt a pair of V-shaped tread members 3', 3' are used, said members also forming a diamond shaped link similar to the integral links 3. One of the tread members 3' may be equipped with the eyes 8 for the hooks 9, while the other tread member 3' has an eye 8' projecting from each end for anchoring a fastening chain as 10, one of which chains is used at each side of the tire.

The fastening chain is passed through an enlarged end or eye 11 of each of the side chains and secured by a hook as 12 which is pivoted at 13 in a double link 14. The double link is of rigid formation and the hook is pivoted between its side plates at 13. The fastening hook 12 is provided with an integral lever arm 15, which when the belt is joined together is secured by a locking link 16 on the side chain. Thus in Figure 2 where one of the fastening hooks is shown in locked position it will be apparent that by slipping the lock-link 16 to the right to release the end of the lever arm 15, the arm may then be swung clockwise to the left to swing the hook portion 12 to the right whereupon the fastening chain 10 may be released therefrom. In locking the adjoining ends of the chains 1 and 2 and the adjoining ends of the tread belt, this process is reversed. After the chain 10 is slipped through the eye 11 at one end of the side chain, the free end of the chain is engaged with the hook 12. For this engagement it will be understood that the lever handle is at the left of its pivot 13 and its hook 12 is at the right of the pivot in Figure 2. Then by swinging the lever handle to position of Figure 2 sufficient leverage is provided to draw the ends of the side chains and the ends of the tread belt into juxtaposition, whereupon the locking link 16 on the side chain is used to lock the lever.

The antiskid belt thus fashioned presents a smooth and continuous traction or friction surface to the roadway for the purpose of gripping the roadway and also to prevent lateral slipping or skidding of the wheels.

While I have illustrated one exemplification of the principles of my invention it will be understood that various changes and alterations may be made therein within the scope of my appended claim, without departing from the principles of my invention.

Having thus fully described my invention, what I claim as new and desire to secure by Letters Patent is—

An antiskid belt comprising a series of tread links and flexible joints therebetween, each link being of integral formation and composed of flexible non-metallic material, a pair of side chains, flexible connections between the tread links and side chains, and means for securing together the free ends of the side chains and of the tread members.

In testimony whereof I affix my signature.

HARRY HARFORD.